3,502,871
PROCESS FOR MAKING A PROJECTION TRANSPARENCY BY EXPOSING A SUBLIMEABLE MATERIAL TO A PATTERN OF INFRARED RADIATION
Walter S. Marx, Jr., and Charles P. Collier, Santa Barbara, Calif., assignors to Printing Arts Research Laboratories, Inc., Santa Barbara, Calif., a corporation of Delaware
No Drawing. Continuation-in-part of application Ser. No. 403,323, Oct. 12, 1964. This application May 23, 1967, Ser. No. 640,511
Int. Cl. G01n 21/34
U.S. Cl. 250—65          39 Claims

ABSTRACT OF THE DISCLOSURE

This patent relates to the graphic arts and has particular reference to a process for the production of projection transparencies and the like from a graphic subject having a surface containing infrared absorbent image areas and background areas having relatively non-infrared absorbent properties, the steps comprising applying a substantially uniform stratum of a sublimeable material onto said surface, placing a light-transmitting film in contact with said stratum-containing surface, exposing said film and surface to infrared radiation for a time sufficient to cause sublimation of quantities of said sublimeable material from said image areas onto said film without substantial melting of said material, whereby said sublimed material becomes an integral part of said film to duplicate said image areas thereon, and separating said film from said subject; articles produced thereby, and articles for use in such process.

---

This application is a continuation-in-part of our copending application Ser. No. 403,323, filed Oct. 12, 1964, now Patent No. 3,418,469, which is a continuation-in-part of Ser. No. 299,401, filed Aug. 1, 1963, now Patent No. 3,210,544.

BACKGROUND OF INVENTION

The field of the present invention pertains to the graphic arts and has particular reference to a process for the production of projection transparencies, articles produced thereby, and articles for use in such process.

Projection transparencies are copies of graphic subjects on transparent or translucent film. These copies are usually projected (and enlarged) onto screens or walls by means of transmitted light for viewing by groups of people for educational or amusement purposes. Normally, image areas of the subject are projected as black (essentially no light projection) in a background of maximum light projection. For example, a projection transparency made from typewritten text on bond paper would consist of non-projecting (black) type characters upon a clear background. The blocking of light in the image areas is accomplished by the use of non-light transmitting or light scattering substances in those areas.

Various modifications of this basic system are in use: e.g. the image areas transmit light while the background transmits no light, or colored light; or the reverse; or the projection may be multicolored. Essentially, however, any projection transparency is a duplication of an original opaque graphic subject. Such duplication consists of light absorbing and light transmitting areas as defined by light reflecting and light absorbing areas of the original subject, and the duplication is capable of being projected by transmitted light.

A number of methods are in use, or have been proposed, for the production of projection transparencies. They include methods characterized as photographic, diazo, dichromate hardening, electrostatic, and various forms of thermographic methods. All of these methods are subject to one or more disadvantages, the more important of which are the necessity for use of expensive equipment, the use of wet processing techniques, the necessity for production from a transparent or translucent original, the failure to produce sharply-defined images, and the necessity for the developing of latent images.

SUMMARY OF THE INVENTION

Briefly, the process of the present invention comprises a thermographic method for making projection transparencies wherein the desired graphic images of the subject are formed on a transparent or translucent sheet or film by sublimation of a compound characterized by having the property of subliming at a temperature substantially lower than its melting temperature, and wherein the sublimed compound becomes an integral part of the film or sheet.

A primary object of the present invention is to provide a novel process for the production of projection transparencies which is not subject to the above and other disadvantages of the prior art.

A further object of the present invention is to provide a novel thermographic process for the production of projection transparencies copied from any existing subject so long as it is in the form of an infrared absorbing graphic image.

A further object of the present invention is to provide novel processes for the extremely quick and inexpensive production of all varieties of projection transparencies and in which the image areas thereof are sharply defined without objectionable spreading of the original image areas.

Still another object of the present invention is to provide novel articles in the form of projection transparencies.

A further object of the present invention is to provide a novel article in the form of a charging sheet for preparation of the graphic subject by unskilled personnel.

Other objects and advantages of this invention it is believed will be readily apparent from the following detailed description of preferred embodiments thereof.

The present process is perhaps best characterized by the term "sublimography." It is a form of the vapor transfer thermography system. Another form of vapor transfer system is disclosed in British Patent 943,401, also South African Patent 60/431, both in the name of Abram Games.

In that system, a graphic art subject, e.g., type-written text, is treated over its entire surface with a vaporizable oil. A translucent paper or transparent film is placed in contact with the face of the text and the combination is exposed to infrared light. The light pases through the translucent paper or film to the test and is reflected from the white areas but absorbed by the black image areas. Absorption of this radiation generates heat which causes the oil contained in or on the black image areas to vaporize and subsequently condense on the overlaying paper or film, producing a latent image. This is then treated with a pigment, or dye which will be selectively absorbed by the image transferred oil.

In contradistinction to the above-described vapor transfer system, the sublimography process of the present invention utilizes materials that sublime, and more particularly, materials that sublime at a temperature substantially lower than that at which they melt. For example, it is preferred to use salicylic acid in the present process, and this material melts at 158° C. and sublimes at 78° C. When such compounds are used, at least two improvements are obtained over the conventional vapor transfer system.

The first is that spread of the image or images is noticeably reduced, due in part at least to the fact that there is no melting and/or liquid flow of the transferring material. The second improvement, one which is extremely important for "black-and-white" projection transparencies, resides in the fact that the transferring material, upon sublimation and condensation or recrystallization on the film, becomes an integral part thereof, the resulting crystals scattering light so effectively that these areas are, for projection purposes, opaque to transmitted light. Thus, no subsequent treatment or development of a latent image is necessary when a transparency for projection of a "black-on-white" image is desired.

DESCRIPTION OF PREFERRED EMBODIMENTS

In carrying out the process of the present invention, a sublimeable material, i.e., a compound or substance which sublimes at a temperature substantially lower than that at which it melts or decomposes, is applied over the entire image-containing surface of the original graphic subject to be reproduced. The thus-treated subject is placed against a transparent or translucent film or sheet with the treated surface of the subject in contact with the film. This assembly is then exposed to infrared radiation for a sufficient length of time to sublime a substantial quantity of the sublimeable material from the graphic subject without substantial melting of the sublimeable material. It is to be understood that, while the sublimeable material as originally applied to the graphic subject covers substantially all areas thereof, including both the infrared absorbent image areas such as typewritten or printed letters, and the white or other spaces between and surrounding the image areas, the sublimeable material is selectively sublimed and is transferred from the graphic subject to the film only in the image areas, due to absorption by the image areas of the infrared radiation with resultant generation of the heat for sublimation, the non-image areas reflecting the radiation and remaining relatively cool so as to preclude sublimation of the sublimeable material therefrom.

In carrying out the first step of application of the sublimeable material to the original graphic subject, the sublimeable material, in finely powdered form, can be dusted on the original sheet containing the graphic images, or it can be sprayed thereon with the material disolved in a suitable solvent. A particularly efficacious means for applying or coating the sublimeable material onto the graphic subject, one which is especially adapted for office use, comprises a so-called charging sheet disclosed in said U.S. Patent No. 3,210,544, the disclosure of which is herein incorporated by reference, such sheets consisting of thin but tear-resistant tissue paper, coated on one side with infrared absorbing material and on the other with the sublimeable material. In use of such a charging sheet, it is placed against the image-bearing surface of the graphic subject with the coating of sublimeable material on the charging sheet in contact with the image-bearing surface. While such contact is maintained, the infrared absorbing surface of the charging sheet is irradiated with infrared radiation, sufficient heat being produced thereby to sublime significant quantities of the sublimeable material and to effect the transfer thereof onto the image-bearing surface of the graphic subject, where the sublimeable material deposits upon cooling to provide a substantially continuous and uniform stratum thereof on the subject. The used charging sheet is then discarded.

In the preparation of a suitable charging sheet for use as described above, any suitable material can be used as the infrared absorbing medium, common printers' ink containing a pigment of carbon black providing an excellent material. As is further disclosed in said U.S. Patent No. 3,210,544, non-black infrared absorbing material such as metal salts can be utilized to produce less opaque charging sheets.

The preferred sublimeable material for use in the process of the present invention is salicylic acid, but other materials can be substituted in whole or part for the salicylic acid, including, but not being limited to, benzoic acid, ortho chlorobenzoic acid, chloranil, isatin, and anthranilic acid, etc.

The transparent or translucent films used in the process of the present invention are those which are sensitive to the sublimeable material when heated to the sublimation temperature. The term "sensitive" as used in this context is intended to apply to films which, during the process of transfer of the sublimeable material from the subject to the film, become softened or otherwise acted upon by the sublimed vapors so that the deposited sublimeable material forms an integral part of the sheet, such as by the formation of a strong adhesive bond. In the production of transparencies for black-and-white projection, the interaction between the film and the sublimeable material during the transfer process must not be so strong that the sublimeable material dissolves in the film to a point where the light-scattering property of the deposited material is substantially impaired or eliminated. Polystyrene films (normally 3 to 5 mils thick) are excellent for this purpose, but other films such as those of a polyester, polyethylene, polypropylene, polyvinyl chloride, polycarbonate, etc., can also be used. In some embodiments of the present invention, as in the production of a negative transparency and/or colored transparencies, films are utilized into which the sublimeable material is dissolved or otherwise dissipated during the transfer process, such film including, among other, polyvinyl acetate, cellulose acetate, cellulose triacetate and cellulose proprionate.

In the production of projection transparencies for projection of a black-on-white image, colorless, preferably clear film is utilized. The deposits of sublimeable material such as salicylic acid produced thereon in accordance with the present invention appear as white on the finished production transparency as viewed directly, but it is to be understood that these white portions, which constitute substantially exact duplications of the image areas of the original subject, adequately block the passage of the projection light therethrough so as to project as "black." For the production of a projection transparency which projects black image areas on a colored background, the process is the same, except that a colored film is utilized. Opaque colors should, of course, be avoided, but transparent films dyed to various colors are commercially available and suitable for use.

A modification of the process of the present invention comprises the production of transparencies adapted to project colored image areas on a clear or "white" background. In carrying out this modification of the process, the general process is the same as that described above, but the sublimeable material is restricted to an acidic material capable of functioning as a fixing agent for basic dyes, salicylic acid again being preferred, but other acidic materials such as benzoic acid, ortho chlorobenzoic acid and anthranilic acid also being effective. Films used in this modification are those which permit substantially complete penetration or dissolving of the sublimeable material in the film during the transfer process, such films including polyvinyl acetate and cellulose derivatives such as cellulose acetate, cellulose triacetate and cellulose proprionate, so that minimum light scattering occurs in the image areas during projection of the finished transparency.

As indicated, the process is substantially the same as that described above, but the infrared heat transfer step produces a virtual latent image on the film, which latent image is developed or colored by the application to the film surface of an aqueous solution of a suitable basic dye which becomes fixed only in the image areas penetrated by the sublimeable acidic material. Upon drying of the dye solution the unfixed dried dye in the background areas is readily removed by application of a dilute acid, the resulting projection transparency consisting of the clear plastic film with the dyed image areas thereon and projecting as a clear or white background with transmitted colored images. As indicated, many water soluble, basic dyes may be used, examples thereof being Basic Violet 3, Basic Green 4, Basic Blue 7, Basic Red 1, Basic Yellow 2 (the numbers being Color Index Numbers as established by the Colour Index, The Society of Dyers and Colourists, The American Association of Textile Chemists and Colorists, second edition 1956).

A further modification of the process of the present invention comprises the production of transparencies designed to project a clear image in a colored background. In this modification, the acidity of acidic sublimeable materials such as salicylic acid, benzoic acid and ortho chlorobenzoic acid is used to convert an indicating dye from its colored to its colorless or less-colored state. This is accomplished by applying a coating of the indicating dye onto a film of the cellulose derivative type, the dye preferably being dispersed or dissolved in a film forming binder such as polyvinyl alcohol, dextrin or polyvinyl acetate emulsion.

Any suitable pH indicator dye can be used so long as it is capable of being converted by the acidic sublimeable material to a changed color state, i.e., to a colorless, less-colored or differently-colored state. Particularly efficacious are dyes such as para nitro phenoyl, ortho nitro phenol or dinitro ortho cresol, which provide a yellow background; Eosin B or phenol sulfonphthalein, which produce a red background, the image areas projecting as a light yellow; bromchlorophenol blue, Acid Blue 1 or Acid Blue 7, which provide yellow image areas on a deep blue background. If necessary, a non-volatile base such as potassium hydroxide, sodium citrate or sodium carbonate may be included in the film-forming binder to maintain the dye in the original color until such a time as the sublimeable acid enters the dyed film and converts the dye.

In carrying out this further modified process, sublimation of the acidic sublimeable material from the image areas of the charged original subject to the dye-coating film brings about conversion of the dye in the image areas to its colorless, less-colored or differently-colored state, and projections from such transparencies consist of clear or light-colored image areas in a colored background. Preferably, the projection transparencies produced by this method are protected against color loss during storage and handling by the application of a clear lacquer over the dye-coated surface of the finished transparency, utilizing a lacquer which is inert with respect to the cellulose derivative film, to the dye coating and to the sublimeable material deposited in the image areas of the film.

In a manner similar to that described above, transparencies designed to project a deeply colored image in a clear or lightly colored background can be obtained by the simple substitution of dyes which are colorless or weakly colored in a non-acid state but are strongly colored when treated with the sublimeable acid. Examples of such dyes are Acid Blue 22, Acid Red 2, Basic Blue 20 and Basic Green 1. In this embodiment, it has been found that the film-forming binder in which the dye is dispersed or dissolved has a distinct effect on the image-forming or image-retaining ability of the sublimation process. Those resins which resist permeation and bleeding by the sublimeable material and/or lateral spread of the deeply colored image improve the storage life of the prepared projection transparency. Resins falling within this category are those which resist permeation of the dye coating by a saturated aqueous salicylic acid solution at a temperature of 140° F. ±5° for one minute, as evidenced by the absence of a dye color at the end of that time period, and which resist laterial spread of the colored image in the prepared projection transparency for 72 hours at room temperature and at least 65% relative humidity.

The following types of resins meet these requirements. Acryloid resins having a high concentration of polymethylmethacrylate polymers and a low concentration of polyethylacrylate. One group of commercial resins having these characteristics is sold under the names Acryloid A–10, Acryloid A–11 and Acryloid A–101 by Rohm and Haas Company, and are further characterized by their resistance to water, alkalies, acids and chemical fumes. These acryloid resins may be applied along with the dyes to the transparent film in the form of an organic solvent solution, e.g., methyl ethyl ketone, propylene glycol monoethyl ether and ethylene glycol monoethyl ether, solution.

Chlorinated polyphenyls, normally chlorinated biphenyl, are also suitable and may be used in a manner similar to the acryloids. One commercially available chlorinated biphenyl is Arochlor 5460, sold by Monsanto Company. The polycarbonate resins are also suitable and may be considered to be the polymers of aromatic diphenolic compounds and phosgene, although many alternate methods of preparation are familiar to those skilled in the art. A commercially available polycarbonate is sold by General Electric Company under the name Lexan 145.

The use of these resins as the binder greatly increases the number of dyes which can be used in this invention, and in fact, a complete range of colors are obtainable. In addition, many dyes are colorless or very faintly colored in these resin binders, even without an alkalizing agent otherwise required to reduce color. The resin binders also seem to stabilize the dye coating since the coating has an improved storage life prior to conversion with the sublimeable materials.

Another modification of this improvement is the inclusion of approximately 0.5% to 2.0% by weight boric acid along with the binder in the dye coating. When, by infrared thermography, salicylic acid is sublimed to and into the film coating, it combines with the boric acid to form a complex, the acidity of which is greater than either acid, alone. By this means, dyes which require an acidity stronger than salicylic acid to change color can be used. Examples of such dyes are Metanil Yellow (C. I. Acid Yellow 36) and Tri Sulfon Paper Yellow (C. I. Direct Yellow 4).

Projection transparencies have been prepared by the above modified process utilizing dyes which produce a dyed coating of a color which effectively blocks light to which lithographic plates are sensitive. Thus, such transparencies are suitable for use as negatives for exposure of lithographic plates, the image areas being clear to very light yellow in color and capable of transmitting ultraviolet and visible light to which such plates are sensitive.

The following specific examples are illustrative of the present invention, but it is to be understood that the invention is not to be limited to the specific details thereof:

EXAMPLE I

This example describes the preparation of a projection transparency of the type adapted to project as "black-on-white," the original graphic subject comprising a sheet of bond paper containing a typewritten text. For the purpose of providing a coating of salicylic acid distributed over the entire surface of the typewritten side of the subject, a charging sheet of short-fiber paper about 0.001″ thick was provided with a surface coating of black-pigmented printers' ink applied by a conventional printing process. On its opposite surface, the sheet of short-fiber paper was provided with a uniform and continuous coating of a solution comprising 10% of salicylic acid by weight in isopropyl alcohol, applied by brushing the solution on the surface, it being understood that conventional spray or other machine equipment can be used for this purpose in production. Upon evaporation of the alcohol, salicylic acid adhered to the paper in a film-like layer of very finely divided particles.

The charging sheet was then placed, black side up, against the subject to be copied, so that the salicylic acid side of the charging sheet was in intimate contact with the typed side of the subject. The superimposed pair of sheets was then passed through a Model 47 Thermo-Fax copying machine (manufactured by Minnesota Mining and Manufacturing Company of St. Paul, Minnesota), the machine utilizing a quartz infrared lamp having a rating of 1350 watts operated at 280–300 volts. In this machine, the black, infrared absorbing surface of the charging sheet was directly exposed to the infrared radiation, the heat produced by only very short-time irradiation being sufficient to sublime sufficient quantities of the salicylic acid from the charging sheet uniformly onto the subject surface, the operation being complete upon emergence of the superimposed sheets from the machine. The used charging sheet was discarded, and the treated original subject, then ready for further processing as described below, contained a substantially continuous and uniform crystallized stratum of salicylic acid which was practically invisible and was adapted to the transmission of infrared radiation.

The thus-treated subject sheet was then placed against a polystyrene film cut to the size of the subject sheet and having a thickness of approximately 4 mils. This assembly of the sheet and film was passed through the Thermo-Fax machine with the film on top and exposed to the quartz lamp. The heat generated by absorption of the infrared radiation in the image areas of the subject was sufficient to cause sublimation, without melting, of substantial portions of the salicyclic acid from the typed image areas of the subject, substantially no salicylic acid being sublimed from the white, reflective areas of the subject sheet. Upon emergence of the sheet and film from the machine, the film was separated from the sheet and was found to be a virtually exact copy of the original subject, the typed characters on the film appearing as "white" and comprising firmly adherent deposits of salicylic acid. These "white" image areas projected as black when he film was placed in a conventional projector. The entire process of the two passes through the Thermo-Fax machine took less than 20 seconds.

EXAMPLE II

The process of this example was substantially the same as that of Example I, except that in place of the use of the charging sheet, the graphic subject to be copied was simply sprayed evently with a 10% solution of salicylic acid in isopropyl alcohol and permitted to dry before assembly with the film and exposure to the infrared radiation.

EXAMPLE III

The process of this example was the same as that of Example I, except that cellulose proprionate film was substituted for polystyrene, and the film, after being irradiated in contact with the salicylic acid-containing original subject, had formed thereon a latent image of the original typewritten text, said image being made up of salicylic acid substantially dissolved in the film itself during the heating and volatilization transfer operation.

The latent image on the film was colored by brushing the image areas with a 5% by weight aqueous solution of Basic Yellow 2. After this dye solution had dried, the film containing the dried dye coating was lightly rubbed with absorbent tissue lightly dampened with 5% hydrochloric acid, thus removing the dried dye from the background areas, the dye in the image areas having been fixed by the salicylic acid and thus not being affected by this rubbing operation. The resultant projection transparency projected a clear background and yellow type areas.

EXAMPLE IV

The process of this example was substantially the same as that of Example I, except that the polystyrene film was substituted by a dye-coated cellulose proprionate film. Thus, prior to irradiation of the film and salicylic acid-treated subject, the cellulose propionate film was coated by brush applying to one surface thereof an aqueous solution containing 10% polyvinyl alcohol and 5% of the sodium salt of para nitro phenol. The solution was allowed to dry to the deep yellow color of the sodium salt and then the film was placed with the dyed side thereof in contact with the salicylic acid-charged original subject and the assembly irradiated as aforesaid. When the salicylic acid was sublimed from the image areas of the charged original subject to this yellow coating, the yellow dye was converted to its colorless state and the resulting projection transparency projected clear image areas in a deep yellow background.

The projection transparency was preserved for storage and handling by applying an acrylic lacquer comprising 10% of a naphtha soluble acrylic resin (Acryloid B67, Rohm & Haas Company) dissolved in an aliphatic naphtha having a boiling range of 208° F. to 250° F.

EXAMPLE V

The process of this example was substantially the same as that of Example IV except that the coating on the cellulose proprionate film was prepared by brush applying an aqueous polyvinyl acetate emulsion of 15% solids to which had been added 2% potassium hydroxide and 5% methyl green (Basic Blue 20). The alkalizing agent maintained the dye in its colorless form.

After the projection transparency conversion the resulting transparency projected deeply green image areas in a clear background.

EXAMPLE VI

The following example is similar to Example V, except that one of the preferred resin binders was used. Acryloid A–10, 10% to 20% by weight of resin and 1% to 3% dye were dissolved in a solvent system containing by volume 15% methyl ethyl ketone, 50% propylene glycol mono methyl ether, and 35% ethylene glycol mono ethyl ether. If alkalizing to reduce or eliminate color was necessary for a dye, the minimum amount functionally necessary was used. This was approximately 0.5% to 1.5% by weight. Base films on which the lacquer coating was applied were polyester, polystyrene, and polycarbonate. The coating, applied by using a No. 10 wire wound laboratory drawdown rod, resulted in a coating thickness, on drying, of approximately 0.0001 to 0.00035 inch.

The following is a partial list of dyes used in film coatings prepared in the above manner, and the image area colors obtained on the transparency after the projection transparency conversion.

TABLE I

| Dye | | Alkalizing agent | Image color |
|---|---|---|---|
| Commercial name | C. I. No. | | |
| Victoria Green B Base. | Solvent Green 1 | None | Green. |
| Rhodamine BI Base. | Solvent Red 49 | do | Magenta. |
| Methyl Green | Basic Blue 20 | KOH | Blue-Green. |
| Auramine Base | Solvent Yellow 34. | None or KOH | Yellow. |
| Methyl Violet Base | Solvent Violet 8 | KOH | Purple. |
| Ethyl Violet | Basic Violet 4 | KOH | Blue-Violet. |
| Sandocyl Red B4G | Basic Red 14 | KOH | Red. |
| Sandocyl Red B3B | Basic Red 15 | KOH | Red. |
| Sandocyl Yellow B6GL. | Basic Yellow 13 | KOH | Yellow. |
| Sandocyl Blue B6G. | Basic Blue 1 | KOH | Blue. |
| Magenta ABN Conc. | Basic Violet 2 | KOH | Magenta. |

Of the listed dyes, the following combinations produce additional colors

| | | |
|---|---|---|
| Auramine Base, Methyl Violet Base. | KOH | Black. |
| Auramine Base, Rhodamine BI Base. | KOH | Orange. |

TABLE I—Continued

By including in the coating a dye not sensitive to color change by the process, tinted backgrounds are obtained. An example of this is:

| | | |
|---|---|---|
| Auramine Base | | |
| Victoria Green B Base | None | Black. |
| Rhodamine BI Base | | |
| Azosol Fast Red BE. | Solvent Red 8 | To give light red background color. |

EXAMPLE VII

The process of this example was the same as Example IV, except that equal parts of Eosin B and dinitro ortho cresol were substituted for the sodium salt of para nitro phenol in the dye solution. Approximately 1% potassium hydroxide was added to maintain the deep color of the two dyes. This resulted in an orange-colored background on the transparency which made it suitable for use as a negative for exposing lithographic plates through the light yellow image areas of the transparency.

Having fully described our invention, it is to be understood that we do not wish to be limited to the details set forth, but our invention is of the full scope of the appended claims.

We claim:

1. A process for the production of projection transparencies in the light from a graphic subject having a surface containing infrared absorbent image areas and background areas having relatively non-infrared absorbent properties, the steps comprising applying a substantially uniform stratum of an acidic sublimeable material onto said surface, placing a light-transmitting film having a non-acid coating on its surface, said coating comprising a solution of a pH indicator dye and a film-forming resin binder which resist permeation and bleeding by the sublimeable material and lateral spread of the dye after it has been acidified by the sublimeable material in contact with said stratum-containing surface, exposing said film and surface to infrared radiation for a time sufficient to cause sublimation of quantities of said sublimeable material of said image areas onto said film without substantial melting of said material, whereby said sublimed material contacts said pH indicator dye on said film causing a color change to duplicate said image areas, and separating said film from said subject.

2. The process of claim 1 wherein said resin binder resists permeation and bleeding by an aqueous saturated salicylic acid solution for one minute at 140° F. ±5° F., and lateral spread of the dye for at least 72 hours at room temperature and 65% relative humidity after it has been acidified by the sublimeable material.

3. The process of claim 1 wherein said resin binder is an acryloid resin containing a major amount of polymethylmethacrylate and a small amount of polyethylacrylate.

4. The process of claim 1 wherein said resin binder is chlorinated polyphenyl.

5. The process of claim 1 wherein said resin binder is an aromatic polycarbonate.

6. The process of claim 1 wherein a coating of a pH indicator dye is applied to the surface of the film to be placed in contact with said subject, said dye in the image areas being converted to its changed color state by reaction with said sublimeable material during the infrared exposure step.

7. The process of claim 1 wherein said dye comprises an alkaline solution of said dye.

8. The method of claim 1 wherein said coating contains boric acid.

9. The process of claim 1 wherein said sublimeable material is selected from the group consisting of salicylic acid, benzoic acid, orthochlorobenzoic acid, chloranil, isatin and anthranilic acid.

10. The process of claim 9 wherein said sublimeable material is salicylic acid.

11. The process of claim 9 wherein said sublimeable material is benzoic acid.

12. The process of claim 1 wherein said sublimeable material is applied onto said surface by utilizing a charging sheet, said charging sheet having on one side thereof a coating of a sublimeable material and an infrared absorbing surface on the other side thereof, placing said one side of said charging sheet in contact with said surface of said subject, and exposing said sheet and subject to infrared radiation for a time sufficient to cause sublimation of sublimeable material from said charging sheet onto said surface of said subject to form said stratum.

13. The process of claim 12 wherein said resin binder resists permeation and bleeding by an aqueous saturated salicylic acid solution for one minute at 140° F. ±5° F., and lateral spread of the dye for at least 72 hours at room temperature and 65% relative humidity after it has been acidified by the sublimeable material.

14. The process of claim 12 wherein said resin binder is an acryloid resin containing a major amount of polymethylmethacrylate and a small amount of polyethylacrylate.

15. The process of claim 12 wherein said resin binder is chlorinated polyphenyl.

16. The process of claim 12 wherein said resin binder is an aromatic polycarbonate.

17. The process of claim 12 wherein a coating of a pH indicator dye is applied to the surface of the film to be placed in contact with said subject, said dye in the image areas being converted to its changed color state by reaction with said sublimeable material during the infrared exposure step.

18. The process of claim 12 wherein said dye comprises an alkaline solution of said dye.

19. The method of claim 25 wherein said coating contains boric acid.

20. The method of claim 12 wherein said coating contains boric acid.

21. The process of claim 20 wherein said sublimeable material is salicylic acid.

22. The process of claim 20 wherein said sublimeable material is benzoic acid.

23. A process for the production of projection transparencies and the like from a graphic subject having a surface containing infrared absorbent image areas and background areas having relatively non-infrared absorbent properties, the steps comprising applying a substantially uniform stratum of an acidic sublimeable material onto said surface, placing a light-transmitting film having a coating comprising a film-forming resin binder which resists permeation and bleeding by the sublimeable material and lateral spread of a dye after it has been acidified by the sublimeable material in contact with said stratum-containing surface, exposing said film and surface to infrared radiation for a time sufficient to cause sublimation of quantities of said sublimeable material from said image areas onto said film without substantial melting of said material, whereby said sublimeable material from said image areas onto said film without substantial melting of said material, whereby said sublime material becomes an integral part of said film to duplicate said image areas thereon, applying a basic dye to the surface of the film containing the sublimeable materials in the image areas thereof, said dye in the image areas being fixed by reaction with the sublimeable material, removing unconverted dye from said film and separating said film from said subject.

24. The process of claim 23 wherein said thermoplastic material is a cellulose derivative and wherein said dye is removed by application of a dilute acid thereto.

25. The process of claim 23 wherein said sublimeable material is applied onto said surface by utilizing a charging sheet, said charging sheet having on one side thereof a coating of a sublimeable material and an infrared absorbing surface on the other side thereof, placing said one side of said charging sheet in contact with said surface of said subject, and exposing said sheet and subject to infrared radiation for a time sufficient to cause sublimation of sublimeable material from said charging sheet onto said surface of said subject to form said stratum.

26. The process of claim 23 wherein said resin binder resists permeation and bleeding by an aqueous saturated salicyclic acid solution for one minute at 140° F. ±5° F., and lateral spread of the dye for at least 72 hours at room temperature and 65% relative humidity after it has been acidified by the sublimeable material.

27. The process of claim 23 wherein said resin binder is an acryloid resin containing a major amount of polymethylmethacrylate and a small amount of polyethylacrylate.

28. The process of claim 23 wherein said resin binder is chlorinated polyphenyl.

29. The process of claim 23 wherein said resin binder is an aromatic polycarbonate.

30. The method of claim 23 wherein said coating contains boric acid.

31. The process of claim 23 wherein said sublimeable material is selected from the group consisting of salicylic acid, benzoic acid, orthochlorobenzoic acid, chloranil, isatin and anthranilic acid.

32. The process of claim 31 wherein said sublimeable material is salicylic acid.

33. The process of claim 31 wherein said sublimeable material is benzoic acid.

34. An unconverted transparency capable of image-wise conversion by contact with a sublimeable material comprising a transparent film base containing thereon a coating comprising a film-forming resin binder and a dye, said resin binder resisting permeation and bleeding by an aqueous saturated salicylic acid solution for one minute at 140° F. ±5° F., and lateral spread of the dye for at least 72 hours at room temperature and 65% relative humidity after it has been acidified by the sublimeable material.

35. The unconverted transparency of claim 34 wherein the resin binder is an acryloid resin containing a major amount of polymethylmethacrylate and a small amount of polyethylacrylate.

36. The unconverted transparency of claim 34 wherein the resin binder is a chlorinated polyphenyl.

37. The unconverted transparency of claim 34 wherein the resin binder is an aromatic polycarbonate.

38. The unconverted transparency of claim 34 wherein the coating additionally contains boric acid.

39. The unconverted transparency of claim 34 wherein said dye is a pH indicator dye.

References Cited

UNITED STATES PATENTS

| | | | |
|---|---|---|---|
| 2,770,534 | 11/1956 | Marx | 250—65.1 |
| 3,147,377 | 9/1964 | Newman | 250—65.1 |
| 3,262,386 | 7/1966 | Gordon | 250—65.1 X |
| 3,280,735 | 10/1966 | Clark et al. | 250—65.1 |

FOREIGN PATENTS 246,832  9/1963  Australia.

ARCHIE R. BORCHELT, Primary Examiner

A. L. BIRCH, Assistant Examiner

U.S. Cl. X.R.

117—36.2, 36.8